(12) United States Patent
Hsieh

(10) Patent No.: US 7,574,291 B2
(45) Date of Patent: Aug. 11, 2009

(54) APPARATUS AND METHOD USING COMPRESSED CODES FOR COMPRISING LATITUDE/LONGITUDE INFORMATION

(75) Inventor: Yun-Feng Hsieh, 764 Sequoia Dr., Sunnyvale, CA (US) 94086

(73) Assignee: Yun-Feng Hsieh, Sunnyvale, CA (US)

( * ) Notice: Subject to any disclaimer, the term of this patent is extended or adjusted under 35 U.S.C. 154(b) by 16 days.

(21) Appl. No.: 11/619,608

(22) Filed: Jan. 3, 2007

(65) Prior Publication Data

US 2008/0162519 A1    Jul. 3, 2008

(51) Int. Cl.
*G01M 17/00* (2006.01)

(52) U.S. Cl. .................. 701/29; 701/208; 701/209; 701/212; 701/213; 434/130; 434/153; 342/465

(58) Field of Classification Search .......... 701/29, 701/208, 209, 212, 213; 434/130, 153; 342/465
See application file for complete search history.

(56) References Cited

U.S. PATENT DOCUMENTS

| | | | | |
|---|---|---|---|---|
| 3,866,553 | A * | 2/1975 | Adams et al. | 112/258 |
| 4,890,249 | A * | 12/1989 | Yen | 703/13 |
| 5,030,117 | A * | 7/1991 | Delorme | 434/130 |
| 5,264,848 | A * | 11/1993 | McGuffin | 341/94 |
| 5,383,128 | A * | 1/1995 | Nishida et al. | 701/210 |
| 6,505,117 | B1 * | 1/2003 | Ratert et al. | 701/209 |
| 6,756,887 | B2 * | 6/2004 | Evans | 340/436 |
| 2005/0273725 | A1 * | 12/2005 | Russon et al. | 715/780 |
| 2005/0288836 | A1 * | 12/2005 | Glass et al. | 701/29 |
| 2006/0022048 | A1 * | 2/2006 | Johnson | 235/462.1 |

* cited by examiner

*Primary Examiner*—Linh V Nguyen

(57) ABSTRACT

A new human interface scheme compresses geographical information, latitudes and longitudes, into a 10 symbols of 36 radices number systems which are based on 36s. It is to simplify the conventional representation of the latitudes and longitudes into much easier to be remembered and accessed by human beings, 10 symbols of 36 radices numbers, "Universal Geo Numbers". The 5 symbols here can give the accuracy for latitudes and longitudes down to 5 meters which should be enough to accommodate the specifications for most geographic navigation related systems (i.e. GPS/GLONASS) and navigation equipments in the consumer market. The apparatus includes all means that comprise latitude/longitude information into the compressed codes for interfacing between human and machines. A technique for compressing latitude and longitude data into a compression code comprises the steps of: taking Latitude/longitude data in decimal format or converting all other formats into decimal format; adding 90 degrees to latitude values and 180 degrees to longitude values in order to shift them into the positive values; eliminating the decimal points and converting the latitude and longitude values in decimal into 5 symbols of 36 based numbers respectively; and interlacing these two numbers inverting a final format. The present invention further includes a decimator, an adder, a converter and an interlacer for performing the step of above method.

2 Claims, 2 Drawing Sheets

APPARATUS AND METHOD USING COMPRESSED CODES FOR COMPRISING LATITUDE/LONGITUDE INFORMATION

FIELD OF THE INVENTION

The present invention relates to latitude and longitude compressing, and particularly to an apparatus and method for encoding latitude/longitude data into a compression code, wherein the Universal Geo Numbers of the present invention is easier for people to remember and to maneuver. For most geographic related instruments and navigation equipments, it is a great way to interface with human beings (somewhat like VCR plus+ to VCRs and TV program recorders) as well.

BACKGROUND OF THE INVENTION

Presently, latitude and longitude are utilized to indicate a coordinate of an entity on the Earth; the latitude is measured from the equator with positive values going toward north and negative values going toward south. The longitude is measured from the Prime Meridian (which is the longitude that runs through Greenwich, England), with positive values going to east and negative values going to west. Therefore, for instance, 65 degrees west of longitude, 45 degrees north of latitude represents −65 degrees longitude, +45 degrees latitude.

On the other hand, the prior methods for representing a geographical coordinate of an entity on the Earth is not too convenient to be recorded, and is very difficult to be exploited in many existing navigation equipments and systems.

SUMMARY OF THE INVENTION

A principal object of the present invention is to provide an algorithm by using compressed codes for representing latitude and longitude information; wherein the Universal Geo Numbers of the present invention is easier for people to remember and to manipulate. For most geographic navigation related instruments and navigation machines, it is also a great way to be interfaced with human beings (somewhat like VCR plus+ to VCRs and TV program recorders).

Accordingly, the present invention provides a method which includes the steps of: taking Latitude/longitude in decimal format or convert all other formats into decimal format first; adding 90 degrees to latitude values and 180 degrees to longitude values in order to shift them into the positive values; eliminating the decimal points and converting the latitude and longitude values in decimal into 5 symbols of 36 based numbers, respectively, and then interlacing these two numbers inverting a final format.

Furthermore, the present invention provides an encoder for compressing codes representing latitude and longitude information, and the encoder comprises: an converter for taking Latitude/longitude data into decimal format or convert all other formats into decimal format; an adder for adding 90 degrees to latitude values and 180 degrees to longitude values in order to shift them into positive values; eliminating decimal points and converting the latitude and longitude values in decimal into 5 symbols of 36 based numbers respectively, say (La1 La2 La3 La4 La5)$_{36}$ and (Lo1 Lo2 Lo3 Lo4 Lo5)$_{36}$; and an interlacer for interlacing these two numbers inverting a final format, (La5 Lo5 La4 Lo4 La3 Lo3 La2 Lo2 La1 Lo1)$_{36}$.

In order to make the invention better understood, there follows a description of embodiments given as examples that do not limit the scope of the invention, and with reference to the accompanying drawings, in which:

DETAILED DESCRIPTION OF THE INVENTION

Figure 1:
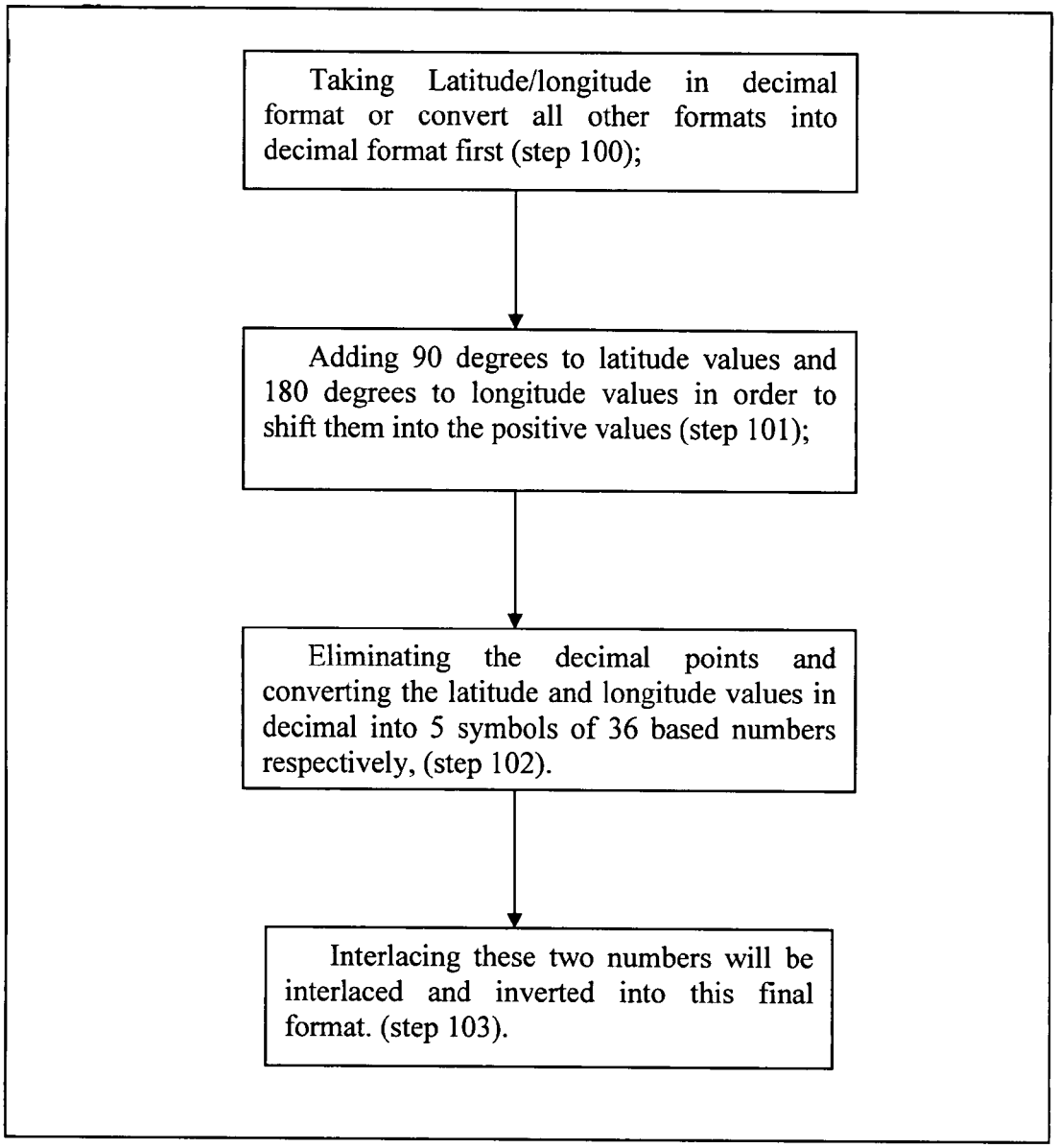
FIG. 1 shows the flow diagram of the present invention.
Figure 2:
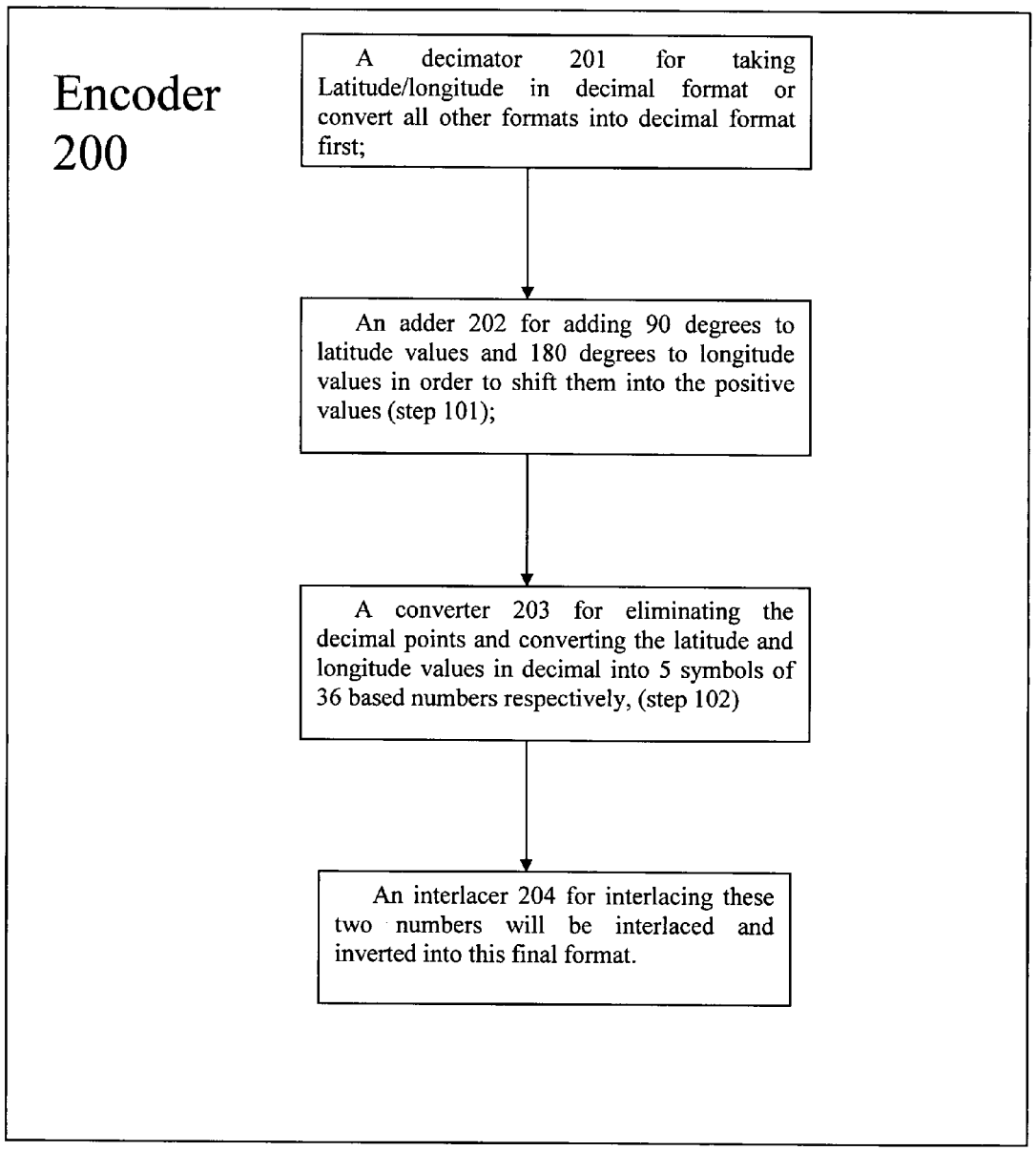
FIG. 2 shows the element of the encoder of the present invention.

In order that those skilled in the art can further understand the present invention, a description will be described in the following in details. Conversely, these descriptions and the appended drawings are only used to cause those skilled in the art to understand the objects, features, and characteristics of the present invention, but not to be used to confine and restrict the scope and the spirit of the present invention defined in the appended claims.

An innovative human interface scheme is disclosed in the present invention to compress geographical information, latitudes and longitudes data into a 10 symbols of 36 radices number systems which are based on 36 digital systems. This 36 radices number system works exactly like the decimal and binary number systems, except that it is based on thirty-sixes. Just like the decimal number system represents a power of 10, each 36 radices number represents a power of 36. The first 10 numbers are exactly the same as the Arabic numbers from 0 to 9. To represent the decimal numbers 10 through 35, this numbering system uses English letters A through Z, respectively. The proposed apparatus is to simplify the conventional representation of the latitude and longitude data into much easier to be remembered and accessed by human beings, 10 symbols of 36 radices numbers, "Universal Geo Numbers".

Each half of the 10 symbols will represent latitudes and longitudes, respectively. The 5 symbols herein can give the accuracy for latitudes and longitudes down to 5 meters which should be enough to accommodate the specifications for most geographic related systems (i.e. GPS/GLONASS) and navigation equipments in the present consumer market. The Universal Geo Numbers are a combination of latitude and longitude numbers. First of all, we convert the usual latitude and longitude numbers in decimal or (degree, minute, second) formats into 5 symbols of 36 based numbers individually, say (La1 La2 La3 La4 La5)$_{36}$ and (Lo1 Lo2 Lo3 Lo4 Lo5)$_{36}$. Then, these two numbers will be interlaced and inverted into this format, (La5 Lo5 La4 Lo4 La3 Lo3 La2 Lo2 La1 Lo1)$_{36}$. The reason for doing this numbering conversion is to make the most changed numbers together. The following formula should only represent one example of many similar converting methods. The claim includes all means that comprise latitude/longitude information into the compressed codes for interfacing between human and machines but not limited.

Universal Geo Numbers Mathematic Formula examples:
The 36 radices number system based on thirty-sixes:
36 radices numbers: 0, 1, 2, 3, 4, 5, 6, 7, 8, 9, A, B, C, D, E, F, G, H, I, J, K, L, M, N, O, P, Q, R, S, T, U, V, W, X, Y, AND Z.

Correspondent decimal numbers: 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, and 35.

The present invention includes the following main steps of.
Taking Latitude/longitude data in decimal format or converting all other formats into decimal format firstly (step 100); Then, before the conversion, adding 90 degrees to the latitude values and 180 degrees to longitude values in order to shift them into positive values (step 101); Eliminating the decimal points and converting the latitude and longitude values in decimal into 5 symbols of 36 based numbers respectively, say $(La1\ La2\ La3\ La4\ La5)_{36}$ and $(Lo1\ Lo2\ Lo3\ Lo4\ Lo5)_{36}$ (step 102). Then, these two numbers are interlaced and inverted into this final format, $(La5\ Lo5\ La4\ Lo4\ La3\ Lo3\ La2\ Lo2\ La1\ Lo1)_{36}$ (step 103).

The present invention further comprises an encoder 200 for compressing codes comprising latitude and longitude information. The encoder comprising: a decimator 201 for taking Latitude/longitude data in decimal format or convert all other formats into decimal format; an adder 202 for adding 90 degrees to latitude values and 180 degrees to longitude values in order to shift them into the positive values; a converter 203 for eliminating the decimal points and converting the latitude and longitude values in decimal into 5 symbols of 36 based numbers respectively, say $(La1\ La2\ La3\ La4\ La5)_{36}$ and $(Lo1\ Lo2\ Lo3\ Lo4\ Lo5)_{36}$; and an interlacer 204 for interlacing these two numbers and inverting a final format, $(La5\ Lo5\ La4\ Lo4\ La3\ Lo3\ La2\ Lo2\ La1\ Lo1)_{36}$.

In the following, three examples are given to be described for understanding the procedure of the present invention.

EXAMPLE 1

Conventional latitude/longitude values in decimal format with 5 digits after decimal point:
Latitude: 20.43567 degrees
Longitude: 101.56789 degrees $$20.43567+90=110.43567\times100{,}000=11043567\ \text{-\,-\,-}$$
$$\rightarrow(6KP9R)_{36}$$

$11043567/36=306765$ remainder: 27 $(R)_{36}$
$306765/36=8521$ remainder: 9 $(9)_{36}$
$8521/36=236$ remainder: 25 $(P)_{36}$
$236/36=6\ (6)36$ remainder: 20 $(K)_{36}$ $$101.56789+180=281.56789\times100{,}000=28156789\ \text{-\,-\,-}$$
$$\rightarrow(GRHX1)_{36}$$

$28156789/36=782133$ remainder: 1 $(1)_{36}$
$782133/36=21725$ remainder: 33 $(X)_{36}$
$21725/36=603$ remainder: 17 $(H)_{36}$
$603/36=16\ (G)\ 36$ remainder: 27 $(R)_{36}$ Take $(6KO9Q)_{36}$ and $(GRHX1)_{36}$ interlaced and inverted into final correspondent Universal Geo Numbers= $(R19XPHKR6G)_{36}$

EXAMPLE 2

Conventional latitude/longitude values in decimal format with 5 digits after decimal point:
Latitude: 20.43216 degrees
Longitude: 101.56123 degrees $$20.43215+90=110.43215\times100{,}000=11043215\ \text{-\,-\,-}$$
$$\rightarrow(6KP00)_{36}$$

$11043216/36=306756$ remainder: 0 $(0)_{36}$
$306756/36=8521$ remainder: 0 $(0)_{36}$
$8521/36=236$ remainder: 25 $(P)_{36}$
$236/36=6\ (6)_{36}$ remainder: 20 $(K)_{36}$ $$101.56123+180=281.56123\times100{,}000=28156123\ \text{-\,-\,-}$$
$$\rightarrow(GRHEJ)_{36}$$

$28156123/36=782114$ remainder: 19 $(J)_{36}$
$782114/36=21725$ remainder: 14 $(E)_{36}$
$21725/36=603$ remainder: 17 $(H)_{36}$
$603/36=16\ (G)_{36}$ remainder: 27 $(R)_{36}$ Take $(6KO00)_{36}$ and $(GRHEJ)_{36}$ interlaced and inverted into Final correspondent Universal Geo Numbers= $(0J0EPHKR6G)_{36}$

EXAMPLE 3

Conventional latitude/longitude values in decimal format with 5 digits after decimal point:
Latitude: −20.43567 degrees
Longitude: −101.56789 degrees $$-20.43567+90=70.43567\times100{,}000=7043567\ \text{-\,-\,-}$$
$$\rightarrow(46YUM)_{36}$$

$7043567/36=195654$ remainder: 23 $(M)_{36}$
$195654/36=5434$ remainder: 30 $(U)_{36}$
$5434/36=150$ remainder: 34 $(Y)_{36}$
$150/36=4(4)\ 36$ remainder: 6 $(6)_{36}$ $$-101.56789+180=78.43211\times100{,}000=7843211\ \text{-\,-\,-}$$
$$\rightarrow(403UZ)_{36}$$

$7843211/36=217866$ remainder: 35 $(Z)_{36}$
$217866/36=6051$ remainder: 30 $(U)_{36}$
$6051/36=168$ remainder: 3 $(3)_{36}$
$168/36=4\ (4)36$ remainder: 24 $(O)_{36}$ Take $(46YUM)_{36}$ AND $(403UZ)_{36}$ interlaced and inverted into Final correspondent Universal Geo Numbers= $(MZUUY36O44)_{36}$ The first two examples show the neighborhood effect of this arithmetical conversion. That means for most people within a town or area the universal geo numbers only differ by first 4 numbers. This will make inputting the numbers into the navigation equipments much easy and fast for people finding other addresses in the nearby area. The third example explains the shifting of negative values.

Nevertheless, the above conversion formula is merely for a reference. The master mind of Universal Geo Numbers should not be limited to just one certain conversion scheme. The patent should be able to cover a bigger picture of the algorithms for a new human interface scheme to convert geographical information, latitudes and longitudes data, into a 10 symbols of 36 radices number systems.

The present invention is thus described. It will be understandable that the same may be varied in many different ways. Such variations are not to be regarded as a departure from the spirit and scope of the present invention, and all such modifications as would be obvious to one skilled in the art are intended to be included within the scope of the following claims.

What is claimed is:

1. A method for compressing both latitude and longitude data into compressed codes; the method comprising the steps of:

taking Latitude/longitude data in decimal format or converting all other formats into decimal format;

adding 90 degrees to the latitude data and 180 degrees to the longitude data in order to shift them into positive values;

eliminating the decimal points and converting the latitude and longitude data in decimal into 5 symbols of 36 based numbers respectively, say $(La1\ La2\ La3\ La4\ La5)_{36}$ and $(Lo1\ Lo2\ Lo3\ Lo4\ Lo5)_{36}$; and interlacing these two numbers and inverting a final format, $(La5\ Lo5\ La4\ Lo4\ La3\ Lo3\ La2\ Lo2\ La1\ Lo1)_{36}$.

2. An encoder for compressing latitude and longitude data into a compression code; the encoder comprising:

a decimator for taking Latitude/longitude data in decimal format or converting all other formats into decimal format;

an adder for adding 90 degrees to latitude data and 180 degrees to longitude data in order to shift them into the positive values;

a converter for eliminating the decimal points and converting the latitude and longitude data in decimal into 5 symbols of 36 based numbers respectively, say $(La1\ La2\ La3\ La4\ La5)_{36}$ and $(Lo1\ Lo2\ Lo3\ Lo4\ Lo5)_{36}$; and an interlacer for interlacing these two numbers and inverting a final format, $(La5\ Lo5\ La4\ Lo4\ La3\ Lo3\ La2\ Lo2\ La1\ Lo1)_{36}$.

* * * * *